US012108133B2

(12) United States Patent
Paek et al.

(10) Patent No.: US 12,108,133 B2
(45) Date of Patent: Oct. 1, 2024

(54) LENS DRIVING DEVICE AND CAMERA MODULE INCLUDING LENS DRIVING DEVICE

(71) Applicant: Samsung Electro-Mechanics Co., Ltd., Suwon-si (KR)

(72) Inventors: Seungyun Paek, Suwon-si (KR); Kyunghun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 177 days.

(21) Appl. No.: 17/977,005

(22) Filed: Oct. 31, 2022

(65) Prior Publication Data

US 2023/0144198 A1 May 11, 2023

(30) Foreign Application Priority Data

Nov. 8, 2021  (KR) .................. 10-2021-0152479
Apr. 21, 2022  (KR) .................. 10-2022-0049737

(51) Int. Cl.
*H04N 23/55* (2023.01)
*G02B 27/64* (2006.01)

(52) U.S. Cl.
CPC ........... *H04N 23/55* (2023.01); *G02B 27/646* (2013.01)

(58) Field of Classification Search
CPC .......... H04N 23/54; H04N 23/55; G02B 7/09; G02B 27/646; G03B 5/00; G03B 13/36; G03B 30/00
See application file for complete search history.

(56) References Cited

U.S. PATENT DOCUMENTS

| 10,827,104 B2 | 11/2020 | Huang et al. |
| 2017/0139225 A1 | 5/2017 | Lim |
| 2017/0229950 A1 | 8/2017 | Moto et al. |
| 2019/0243087 A1 | 8/2019 | Osaka et al. |
| 2024/0168362 A1* | 5/2024 | Kang ................ G03B 17/12 |

FOREIGN PATENT DOCUMENTS

| JP | 2017-138601 A | 8/2017 |
| JP | 2019-135519 A | 8/2019 |
| JP | 2021-92655 A | 6/2021 |
| KR | 10-2018-0129343 A | 12/2018 |
| KR | 10-2019-0087814 A | 7/2019 |
| KR | 10-2020-0133703 A | 11/2020 |

OTHER PUBLICATIONS

Korean Office Action issued on Apr. 18, 2024, in counterpart Korean Patent Application No. 10-2022-0049737 (9 pages in English, 8 pages in Korean).

* cited by examiner

*Primary Examiner* — Lin Ye
*Assistant Examiner* — Chriss S Yoder, III
(74) *Attorney, Agent, or Firm* — NSIP Law

(57) ABSTRACT

A lens driving device includes a lens holder configured to hold a lens barrel; and an image stabilization driver including an image stabilization magnet and an image stabilization coil facing each other and configured to apply a driving force to the lens holder in a direction perpendicular to an optical axis of the lens holder, wherein the lens holder includes a molded frame structure, and a magnet mounting bracket including an upper plate member protruding away from an upper end of an external side of the molded frame structure in a direction perpendicular to the optical axis, and an upper side of the upper plate member is disposed on a same plane as an upper side of the molded frame structure of the lens holder.

28 Claims, 11 Drawing Sheets

LENS DRIVING DEVICE AND CAMERA MODULE INCLUDING LENS DRIVING DEVICE

CROSS-REFERENCE TO RELATED APPLICATIONS

This application claims the benefit under 35 USC 119(a) of Korean Patent Application Nos. 10-2021-0152479 filed on Nov. 8, 2021, and 10-2022-0049737 filed on Apr. 21, 2022, in the Korean Intellectual Property Office, the entire disclosures of which are incorporated herein by reference for all purposes.

BACKGROUND

1. Field

The present disclosure relates to a lens driving device and a camera module including a lens driving device.

2. Description of Related Art

As information communication techniques and semiconductor techniques rapidly develop, supply and use of electronic devices are steeply increasing. The electronic devices do not merely perform functions in their own traditional areas of technology, but combine functions from various areas of technology, and perform the combined functions.

Camera modules have become standard features in portable electronic devices such as smartphones, tablet PCs, and laptop computers, and an autofocus (AF) function, an image stabilization (IS) function, and a zoom function are typically included in the camera modules provided in the portable electronic devices.

The image stabilization function may include camera shaking correction and hand shaking correction, and it may prevent images of subjects from being blurry when they are photographed when unintentional hand shaking or camera shaking occurs.

The autofocus function allows acquiring of clear images on an imaging plane of an image sensor by moving a lens positioned at the front of the image sensor in the optical axis direction depending on the distance from the subject.

As the electronic devices in which the camera module is provided have become thinner, the camera module must also become thinner, and to realize the thinner camera module, the constituent elements of the camera module must also become thinner, and great rigidity is simultaneously needed.

The above information disclosed in this Background section is only for enhancement of understanding of the background of the disclosure, and therefore it may contain information that does not constitute prior art that is already known to a person of ordinary skill in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens driving device includes a lens holder configured to hold a lens barrel; and an image stabilization driver including an image stabilization magnet and an image stabilization coil facing each other and configured to apply a driving force to the lens holder in a direction perpendicular to an optical axis of the lens holder, wherein the lens holder includes a molded frame structure, and a magnet mounting bracket including an upper plate member protruding away from an upper end of an external side of the molded frame structure in a direction perpendicular to the optical axis, and an upper side of the upper plate member is disposed on a same plane as an upper side of the molded frame structure of the lens holder.

The upper plate member may include a magnetic material exposed to an outside of the molded frame structure of the lens holder.

The magnet mounting bracket may further include a magnet mounting portion including a magnetic material on an external side of the molded frame structure of the lens holder.

The upper plate member may be integrally bent from the magnet mounting portion in the direction perpendicular to the optical axis.

The molded frame structure of the lens holder may include a projection portion covering parts of a front edge of the upper plate member at end portions of the magnet mounting bracket in a width direction of the magnet mounting bracket to lock the magnet mounting bracket in place on the molded frame structure of the lens holder.

A central portion of the magnet mounting bracket in a width direction of the magnet mounting bracket may be unobstructed in a direction of the optical axis, the upper plate member may include a pair of upper plate members extending in the direction perpendicular to the optical axis at upper ends of end portions of the magnet mounting bracket in the width direction that block the end portions of the magnet mounting bracket in the optical axis direction, and the image stabilization magnet may be disposed on a central portion of the magnet mounting bracket in the width direction and on the end portions of the magnet mounting bracket in the width direction.

The image stabilization magnet may include an uplift portion protruding upward in the optical axis direction from the central portion of the magnet mounting bracket in the width direction.

An upper side of the image stabilization magnet may include a step portion that is lower than the uplift portion at the end portions of the magnet mounting bracket in the width direction and faces the upper plate member in the optical axis direction.

The molded frame structure of the lens holder may include a first external side and a second external side that are adjacent to each other and perpendicular to each other, the magnet mounting bracket may include a first magnet mounting bracket and a second magnet mounting bracket respectively disposed on the first external side and the second external side of the molded frame structure of the lens holder, the image stabilization magnet may include a first image stabilization magnet and a second image stabilization magnet respectively disposed on the first magnet mounting bracket and the second magnet mounting bracket, the image stabilization coil may include a first image stabilization coil and a second image stabilization coil respectively facing the first image stabilization magnet and the second image stabilization magnet, the first image stabilization magnet and the first image stabilization coil may be configured to apply a driving force to the lens holder in a first axis direction perpendicular to the optical axis, and the second image stabilization magnet and the second image stabilization coil may be configured to apply a driving force to the lens holder in a second axis direction perpendicular to the optical axis and perpendicular to the first axis direction.

In another general aspect, a camera module includes a housing; a lens barrel in which at least one lens is disposed; a lens holder in which the lens barrel is disposed; a frame supporting the lens holder; a carrier in which the lens holder and the frame are disposed, the carrier being disposed in the housing; and an image stabilization driver including an image stabilization magnet and an image stabilization coil facing each other and configured to apply a driving force to the lens holder in a direction perpendicular to an optical axis of the lens barrel, wherein the lens holder includes a molded frame structure, and a magnet mounting bracket including an upper plate member protruding away from an upper end of an external side of the molded frame structure in a direction perpendicular to the optical axis, and an upper side of the upper plate member is disposed on a same plane as an upper side of the molded frame structure of the lens holder.

The upper plate member may include a magnetic material exposed to an outside of the molded frame structure of the lens holder.

The magnet mounting bracket may further include a magnet mounting portion including a magnetic material on the external side of the molded frame structure of the lens holder.

The upper plate member may be integrally bent from the magnet mounting portion in the direction perpendicular to the optical axis.

The molded frame structure of the lens holder may include a projection portion covering parts of a front edge of the upper plate member at end portions of the magnet mounting bracket in a width direction of the magnet mounting bracket to lock the magnet mounting bracket in place on the molded frame structure of the lens holder.

A central portion of the magnet mounting bracket in a width direction of the magnet mounting bracket may be unobstructed in a direction of the optical axis, the upper plate member may include a pair of upper plate members extending in the direction perpendicular to the optical axis at upper ends of end portions of the magnet mounting bracket in the width direction that block the end portions of the magnet mounting bracket in the optical axis direction, and the image stabilization magnet may be disposed on the central portion of the magnet mounting bracket in the width direction and on the end portions of the magnet mounting bracket in the width direction.

The image stabilization magnet may include an uplift portion protruding upward in the optical axis direction from the central portion of the magnet mounting bracket in the width direction.

An upper side of the image stabilization magnet may include a step portion that is lower than the uplift portion at the end portions of the magnet mounting bracket in the width direction and faces the upper plate member in the optical axis direction.

The molded frame structure of the lens holder may include a first external side and a second external side that are adjacent to each other and perpendicular to each other, the magnet mounting bracket may include a first magnet mounting bracket and a second magnet mounting bracket respectively disposed on the first external side and the second external side of the molded frame structure of the lens holder, the image stabilization magnet may include a first image stabilization magnet and a second image stabilization magnet respectively disposed on the first magnet mounting bracket and the second magnet mounting bracket, the image stabilization coil may include a first image stabilization coil and a second image stabilization coil respectively facing the first image stabilization magnet and the second image stabilization magnet, the first image stabilization magnet and the first image stabilization coil may be configured to apply a driving force to the lens holder in a first axis direction perpendicular to the optical axis, and the second image stabilization magnet and the second image stabilization coil may be configured to apply a driving force to the lens holder in a second axis direction perpendicular to the optical axis and perpendicular to the first axis direction.

In another general aspect, a lens driving device includes a lens holder configured to hold a lens barrel; a carrier in which the lens barrel is disposed; and a focus driver including a focus magnet and a focus coil configured to apply a driving force to the carrier in a direction of an optical axis of the lens holder, wherein the carrier includes a molded frame structure, and a magnet mounting bracket including an upper plate member protruding away from an upper end of an external side of the molded frame structure in a direction perpendicular to the optical axis, and an upper side of the upper plate member is disposed on a same plane as an upper side of the molded frame structure.

The magnet mounting bracket may further include a magnet mounting portion including a magnetic material on an external side of the molded frame structure of the carrier.

A central portion of the magnet mounting bracket in a width direction of the magnet mounting bracket may be unobstructed in the optical axis direction, the upper plate member may include a pair of upper plate members extending in the direction perpendicular to the optical axis at upper ends of end portions of the magnet mounting bracket in the width direction that block the end portions of the magnet mounting bracket in the optical axis direction, and the focus magnet may be disposed on a central portion of the magnet mounting bracket in the width direction and on the end portions of the magnet mounting bracket in the width direction.

The focus magnet may include an uplift portion protruding upward in the optical axis direction from the central portion of the magnet mounting bracket in the width direction.

An upper side of the image stabilization magnet may include a step portion that is lower than the uplift portion at the end portions of the magnet mounting bracket in the width direction and faces the upper plate member in the optical axis direction.

In another general aspect, a camera module includes a housing; a lens barrel in which at least one lens is disposed; a lens holder in which the lens barrel is disposed; a frame supporting the lens holder; a carrier in which the lens holder and the frame are disposed, the carrier being disposed in the housing; and a focus driver including a focus magnet and a focus coil facing each other and configured to apply a driving force to the carrier in a direction of an optical axis of the lens barrel, wherein the carrier includes a molded frame structure, and a magnet mounting bracket including an upper plate member protruding away from an upper end of an external side of the molded frame structure in a direction perpendicular to the optical axis direction, and an upper side of the upper plate member is disposed on a same plane as an upper side of the molded frame structure of the carrier.

The magnet mounting bracket may further include a magnet mounting portion including a magnetic material on the external side of the molded frame structure of the carrier.

A central portion of the magnet mounting bracket in a width direction of the magnet mounting bracket may be unobstructed in the optical axis direction, the upper plate member may include a pair of upper plate members extending in the direction perpendicular to the optical axis at upper ends of end portions of the magnet mounting bracket in the width direction that block the end portions of the magnet mounting bracket in the optical axis direction, and the focus magnet may be disposed on the central portion of the magnet mounting bracket in the width direction and on the end portions of the magnet mounting bracket in the width direction.

The focus magnet may include an uplift portion protruding upward in the optical axis direction from the central portion of the magnet mounting bracket in the width direction.

An upper side of the image stabilization magnet may include a step portion that is lower than the uplift portion at the end portions of the magnet mounting bracket in the width direction and faces the upper plate member in the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
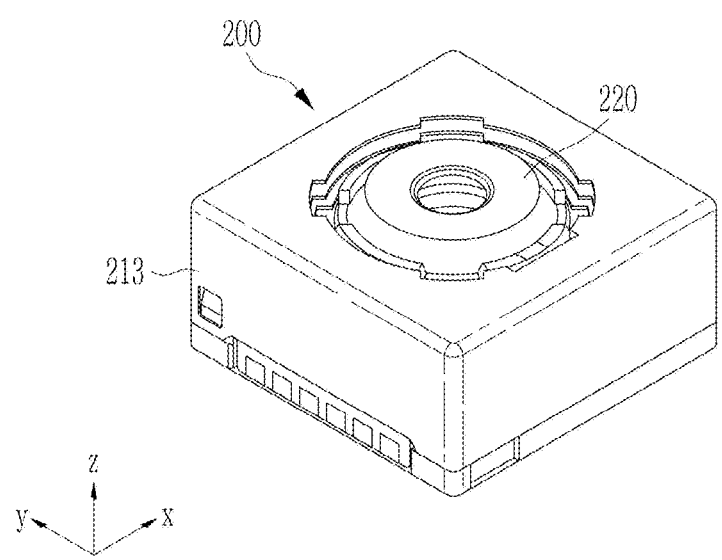
FIG. 1 shows a perspective view of a camera module according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The phrase "in a plan view" or "on a plane" means viewing a target portion from the top, and the phrase "in a cross-sectional view" or "on a cross-section" means viewing a cross-section formed by perpendicularly cutting a target portion from the side.

Figure 2:
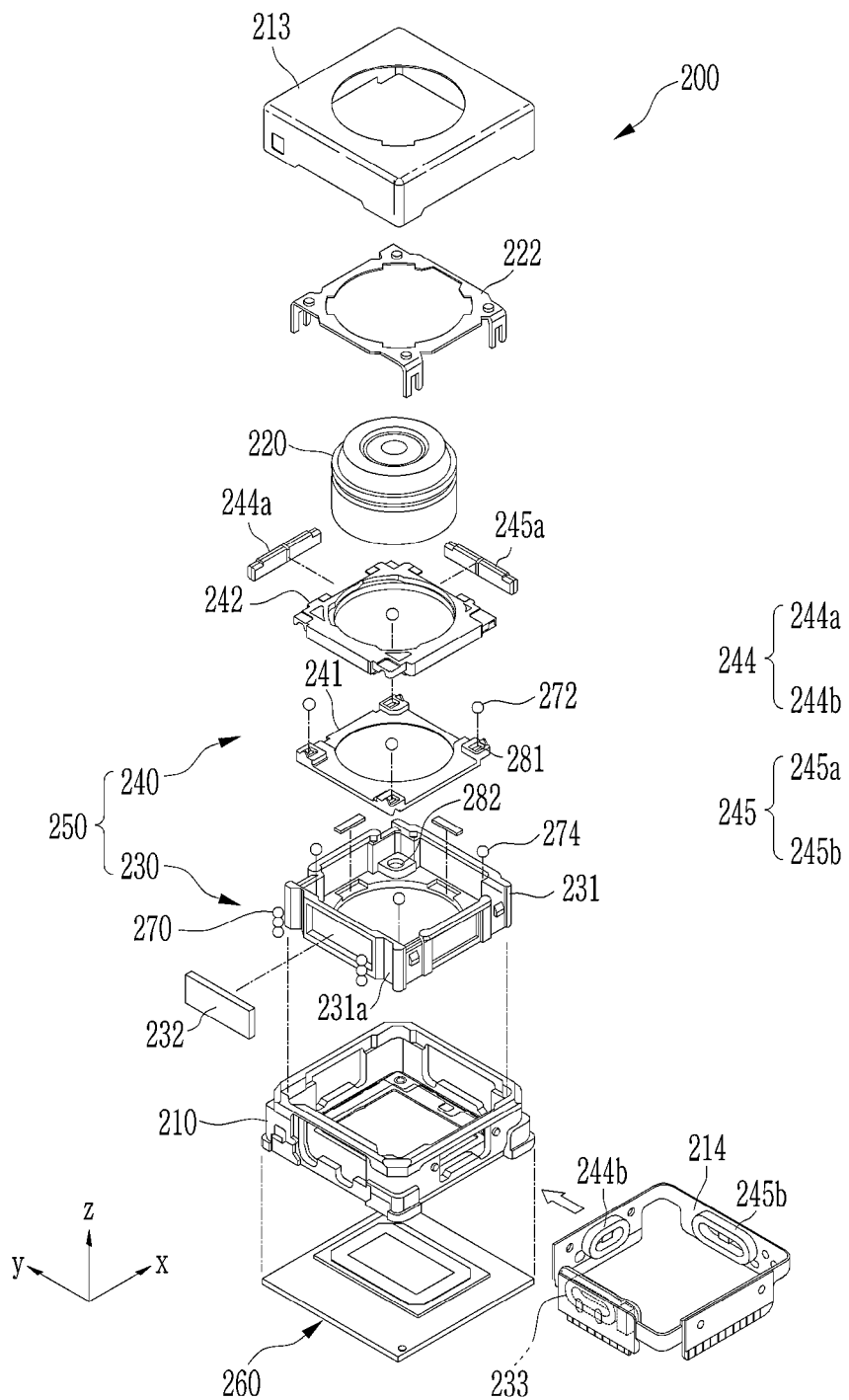
FIG. 2 shows an exploded perspective view of the camera module shown in FIG. 1.

FIG. 1 shows a perspective view of a camera module according to an embodiment, and FIG. 2 shows an exploded perspective view of the camera module shown in FIG. 1.

Referring to FIGS. 1 and 2, a camera module 200 according to the present embodiment includes a lens barrel 220, a lens driving device 250 for moving the lens barrel 220, an image sensor unit 260 for converting light input through the lens barrel 220 into electric signals, a housing 210 for accommodating the lens barrel 220 and the lens driving device 250, and a cover 213.

The lens barrel 220 may have a hollow space in a cylindrical shape for receiving a plurality of lenses for photographing a subject into the lens barrel 220, and the lenses are mounted in the lens barrel 220 along an optical axis. A required number of lenses may be disposed according to a design of the lens barrel 220, and the respective lenses may have optical characteristics such as identical or different refractive indexes. The optical axis may be set to be a z-axis in the drawing.

The lens driving device 250 moves the lens barrel 220, and includes a focus unit 230 for adjusting a focus of the camera module 200 and an image stabilization unit 240 for correcting hand trembling or shaking of the camera module 200.

For example, the lens driving device 250 may use the focus unit 230 to move the lens barrel 220 in an optical axis direction (i.e., the z-axis direction in the drawing) to control the focus, and it may use the image stabilization unit 240 to move the lens barrel 220 in a direction (i.e., an x-axis or a y-axis direction in the drawing) that is perpendicular to the optical axis direction to correct the hand trembling or shaking at the time of photographing.

The focus unit 230 includes a carrier 231 for accommodating the lens barrel 220 and a focus driver for generating a driving force for moving the lens barrel 220 and the carrier 231 in the optical axis direction. The focus driver includes a focus magnet 232 and a focus coil 233.

When a power voltage is applied to the focus coil 233, the carrier 231 may be moved in the optical axis direction by an electromagnetic force between the focus magnet 232 and the focus coil 233. Since the lens barrel 220 is disposed in the carrier 231, the lens barrel 220 may also move in the optical axis direction with the carrier 231, and the focus may be adjusted.

For example, the focus magnet 232 may be installed on one side of the carrier 231, and the focus coil 233 may be installed on the housing 210 via a substrate 214. In this example, the focus magnet 232 is a moving member that is mounted on the carrier 231 and moves in the optical axis direction together with the carrier 231, and the focus coil 233 is a stationary member that is fixed to the housing 210. However, this is only an example, and positions of the focus magnet 232 and the focus coil 233 may be exchanged with each other.

Rolling members 270 may be disposed between the carrier 231 and the housing 210 to reduce friction between the carrier 231 and the housing 210 when the carrier 231 moves. The rolling members 270 may have a ball shape, and may be disposed on opposite sides of one side of the carrier 231. Guide grooves 231a may be formed in the carrier 231 so that the rolling members 270 may be disposed therein and may be guided in the optical axis direction.

The image stabilization unit 240 corrects blurring of images or shaking of videos by factors such as vibration of a hand of a user when the images or the videos are photographed. That is, when the images are shaken while they are photographed by the hand shaking of the user, the image stabilization unit 240 compensates for the shaking by providing a relative displacement that corresponds to the shaking to the lens barrel 220. For example, the image stabilization unit 240 corrects the shaking by moving the lens barrel 220 in the x-axis and y-axis directions that are perpendicular to the optical axis direction.

The image stabilization unit 240 includes a guide assembly for guiding the movement of the lens barrel 220, and an image stabilization driver for generating a driving force for moving the guide assembly in a direction that is perpendicular to the optical axis direction.

The guide assembly includes a frame 241 and a lens holder 242. The frame 241 and the lens holder 242 are inserted into the carrier 231 and are disposed in the optical axis direction, and guide the movement of the lens barrel 220.

The frame 241 and the lens holder 242 provide a space into which the lens barrel 220 may be inserted, and the lens barrel 220 is fixed to the lens holder 242. The lens holder 242 may have a quadrangular frame shape, and the frame 241 may have a quadrangular frame structure corresponding to the quadrangular frame shape of the lens holder 242. Image stabilization magnets 244a and 245a may be provided on two external sides of the lens holder 242 that are adjacent to each other and orthogonal to each other.

The image stabilization driver includes a first image stabilization driver 244 and a second image stabilization driver 245, and the first and second image stabilization drivers 244 and 245 include the image stabilization magnets 244a and 245a and image stabilization coils 244b and 245b.

The first image stabilization driver 244 generates a driving force in the first axis direction (the x-axis direction) that is perpendicular to the optical axis direction, and the second image stabilization driver 245 generates a driving force in the second axis direction (the y-axis direction) that is perpendicular to the optical axis direction and the first axis direction. The second axis (the y-axis) is perpendicular to the optical axis (the z-axis) and the first axis (the x-axis). The first image stabilization driver 244 and the second image stabilization driver 245 may be orthogonal to each other in a plane that is perpendicular to the optical axis.

The image stabilization magnets 244a and 245a of the first and second image stabilization drivers 244 and 245 are mounted on the lens holder 242, and the image stabilization coils 244b and 245b respectively facing the image stabilization magnets 244a and 245a are mounted on the housing 210 via the substrate 214. In another example, the image stabilization coils 244b and 245b may be installed to face the image stabilization magnets 244a and 245a by using another structure that is not the substrate 214 and the housing 210.

The image stabilization magnets 244a and 245a are moving members that move in a direction that is perpendicular to the optical axis direction together with the lens holder 242, and the image stabilization coils 244b and 245b are stationary members that are fixed to the housing 210. However, this is only an example, and the positions of the image stabilization magnets 244a and 245a and the image stabilization coils 244b and 245b may be exchanged with each other.

The present embodiment provides a plurality of ball members for supporting the image stabilization unit 240. The ball members facilitate movement of the frame 241 and the lens holder 242 in the image stabilization process. The ball members maintain gaps between the carrier 231, the frame 241, and the lens holder 242.

The ball members include first ball members 272 and second ball members 274. The first ball members 272 facilitate movement of the image stabilization unit 240 in the first axis direction (the x-axis direction), and the second ball members 274 facilitate movement of the image stabilization unit 240 in the second axis direction (the y-axis direction). The first ball members 272 include a plurality of ball members disposed between the frame 241 and the lens holder 242, and the second ball members 274 include a plurality of ball members disposed between the carrier 231 and the frame 241.

A first guide groove portion 281 for receiving the first ball members 272 is formed on a side of the frame 241 facing the lens holder 242 in the optical axis direction. The first guide groove portion 281 includes a plurality of guide grooves.

The first ball members 272 are disposed in the first guide groove portion 281 so that they are disposed between the frame 241 and the lens holder 242. While they are disposed in the first guide groove portion 281, the first ball members 272 may not move in the optical axis direction and the second axis direction (the y-axis direction), and may move only in the first axis direction (the x-axis direction). For this purpose, the guide grooves of the first guide groove portion 281 in a plan view may have a rectangular shape in which a length in the first axis direction is greater than a width in the second axis direction.

A second guide groove portion 282 for receiving the second ball members 274 is formed on a side of the carrier 231 facing the frame 241 in the optical axis direction.

The second guide groove portion 282 includes a plurality of guide grooves. The second ball members 274 are disposed in the second guide groove portion 282 so that they are disposed between the carrier 231 and the frame 241. While they are disposed in the second guide groove portion 282, the second ball members 274 may not move in the optical axis direction and the first axis direction (the x-axis direction), and may move only in the second axis direction (the y-axis direction).

The image sensor unit 260 converts light input through the lens barrel 220 into electrical signals. For example, the image sensor unit 260 may include an image sensor and a flexible printed circuit (FPC) on which the image sensor is mounted, and may further include an infrared ray filter. The infrared ray filter blocks light of an infrared ray region in the light input through the lens barrel 220.

The lens barrel 220 and the lens driving device 250 are disposed in an internal space of the housing 210. For example, the housing 210 may have a box shape having openings in the top and bottom. The image sensor unit 260 is mounted on the bottom of the housing 210.

A stopper 222 is disposed over the lens barrel 220 and fastened to the carrier 231 to hold the lens barrel 220, the lens holder 242, the first ball members 272, the frame 241, and the second ball members 274 in place.

The cover 213 is fastened to the housing 210 to surround the housing 210 and protect the internal components of the camera module 200. The cover 213 may shield electromagnetic waves generated by the camera module 200. For example, the cover 213 may shield the electromagnetic waves generated by the camera module 200 so that they may not influence other electronic parts in the portable electronic device.

Figure 3:
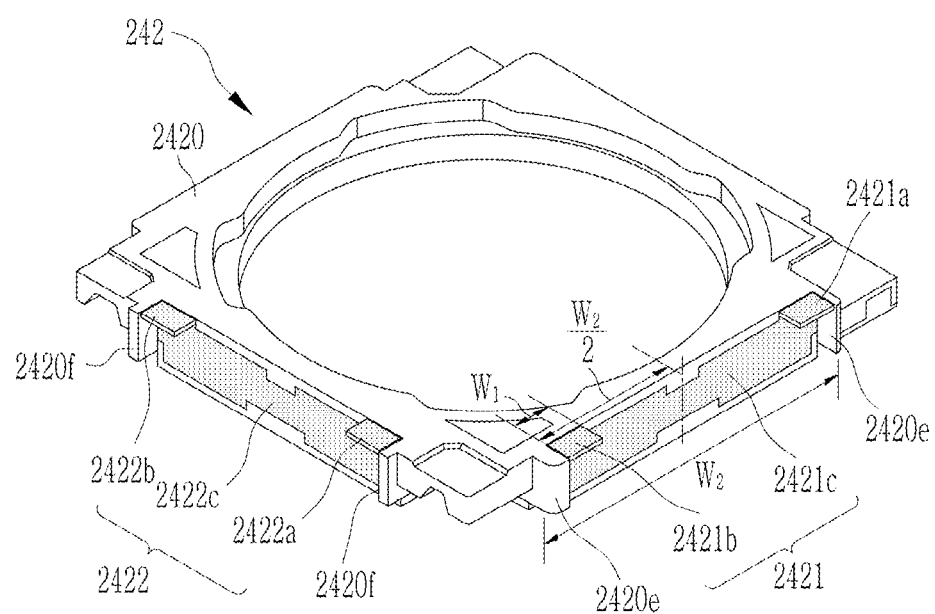
FIG. 3 shows a perspective view of a lens holder of the camera module shown in FIG. 2 according to an embodiment.

FIG. 3 shows a perspective view of a lens holder of the camera module shown in FIG. 2.

Referring to FIG. 3, the lens holder 242 according to the present embodiment includes a molded frame structure 2420, and a first magnet mounting bracket 2421 and a second magnet mounting bracket 2422 respectively disposed on a first external side and a second external side of the molded frame structure 2420 that are adjacent to each other and are orthogonal to each other.

A central portion of the first magnet mounting bracket 2421 in a width direction of the first magnet mounting bracket 2421, i.e., the first axis direction (the x-axis direction), may be unobstructed in the optical axis direction, and end portions of the first magnet mounting bracket 2421 in the width direction of the first magnet mounting bracket 2421, i.e., the first axis direction (the x-axis direction), may be blocked in the optical axis direction at upper ends of the end portions of the first magnet mounting bracket 2421.

A central portion of the second magnet mounting bracket 2422 in a width direction of the second magnet mounting bracket 2422, i.e., the second axis direction (the y-axis direction), may be unobstructed in the optical axis direction, and end portions of the second magnet mounting bracket 2422 in the width direction of the first magnet mounting bracket 2421, i.e., the second axis direction (the y-axis direction), may be blocked in the optical axis direction at upper ends of the end portions of the second magnet mounting bracket 2422.

That is, upper plate members 2421a, 2421b, 2422a, and 2422b perpendicularly protruding to an outside from a first external side or a second external side of the lens holder 242 may be respectively disposed on respective end portions of the first and second magnet mounting brackets 2421 and 2422. The upper plate members 2421a, 2421b, 2422a, and 2422b may be formed with plate pieces that have sides that are perpendicular to the optical axis direction. The upper sides of the upper plate members 2421a, 2421b, 2422a, and 2422b may be on the same level as the upper side of the lens holder 242 and may be disposed on a same plane. In other words, the upper sides of the upper plate members 2421a, 2421b, 2422a, and 2422b and the upper side of the lens holder 242 may be configured to be at the same height.

The molded frame structure 2420 of the lens holder 242 may be made of a resin material, and the upper plate members 2421a, 2421b, 2422a, and 2422b may be made of a magnetic material exposed to the outside of the molded frame structure 2420. For example, the upper plate members 2421a, 2421b, 2422a, and 2422b may be made of magnetic stainless steel.

The first and second magnet mounting brackets 2421 and 2422 may include magnet mounting portions 2421c and 2422c on the first external side or the second external side of the molded frame structure 2420. Image stabilization magnets 244a and 245a may be mounted on and fixed to the magnet mounting portions 2421c and 2422c by magnetic attraction because the magnet mounting portions 2421c and 2422c may be made of a magnetic material. For example, the magnet mounting portions 2421c and 2422c may be made of magnetic stainless steel. The upper plate members 2421a, 2421b, 2422a, and 2422b may be integrally bent from the magnet mounting portions 2421c and 2422c in a direction perpendicular to the optical axis direction. When a width is measured in the first axis direction (the x-axis direction) or the second axis direction (the y-axis direction) that is perpendicular to the optical axis direction and is parallel to the first external side or the second external side, the width W1 of the upper plate members 2421a, 2421b, 2422a, and 2422b may be less than a half width W2/2 of the entire width W2 of the magnet mounting portions 2421c and 2422c.

Hence, a space may be acquired in the central portion between one pair of upper plate members 2421a, 2421b, 2422a, and 2422b disposed on respective end portions of the first and second magnet mounting brackets 2421 and 2422, and sizes of the image stabilization magnets 244a and 245a in the central portions of the image stabilization magnets 244a and 245a may be further increased in the space.

In addition, the molded frame structure 2420 of the lens holder 242 may include lateral plate members 2420e and 2420f perpendicularly protruding to the outside from the first external side or the second external side at the end portions of the first and second magnet mounting brackets 2421 and 2422. The lateral plate members 2420e and 2420f may have a plate structure having a side that is perpendicular to the first axis direction or the second axis direction, and may be configured to at least partially cover ends of the first image stabilization magnet 244a and the second image stabilization magnet 245a in width directions of the first image stabilization magnet 244a and the second image stabilization magnet 245a.

Figure 4:
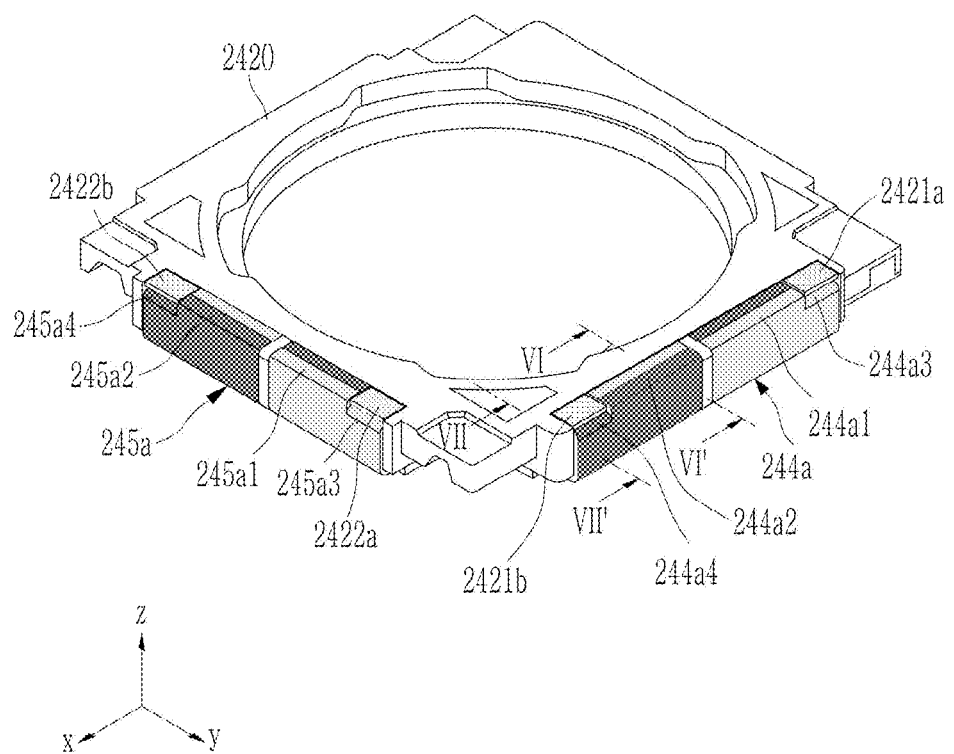
FIG. 4 shows a perspective view of a state in which an image stabilization magnet is mounted on the lens holder shown in FIG. 3.
Figure 5:
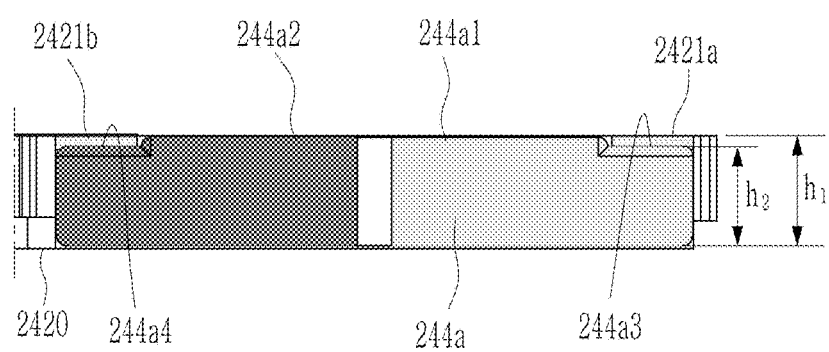
FIG. 5 shows a side view of the lens holder and image stabilization magnet shown in FIG. 4.
Figure 5:
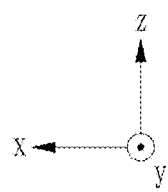

FIG. 4 shows a perspective view of a state in which an image stabilization magnet is mounted on the lens holder shown in FIG. 3, and FIG. 5 shows a side view of the lens holder and the image stabilization magnet shown in FIG. 4.

Referring to FIG. 4, the first image stabilization magnet 244a may be fixed to the first magnet mounting bracket 2421 on the first external side of the lens holder 242, and the second image stabilization magnet 245a may be fixed to the second magnet mounting bracket 2422 on the second external side of the lens holder 242.

The light portions of the image stabilization magnets 244a and 245a in FIGS. 4 and 5 may be north poles of the image stabilization magnets 244a and 245a, and the dark portions of the image stabilization magnets 244a and 245a in FIGS. 4 and 5 may be south poles of the image stabilization magnets 244a and 245a. Alternatively, the light portions may be south poles, and the dark portions may be north poles.

Regarding the lens holder 242, the first image stabilization magnet 244a and the second image stabilization magnet 245a may be disposed on the central portion of the first and second magnet mounting brackets 2421 and 2422 in the width direction and on the end portions of the first and second magnet mounting brackets 2421 and 2422 in the width direction. That is, the first image stabilization magnet 244a and the second image stabilization magnet 245a may extend to the end portions from the central portion of the first magnet mounting bracket 2421 and the second magnet mounting bracket 2422 in the width direction and may be disposed up to where an upper end of the first image stabilization magnet 244a and the second image stabilization magnet 245a is blocked by the upper plate members 2421a, 2421b, 2422a, and 2422b.

Referring to FIGS. 4 and 5, the first image stabilization magnet 244a and the second image stabilization magnet 245a may include uplift portions 244a1, 244a2, 245a1, and 245a2 protruding upward in the optical axis direction from the central portion of the first magnet mounting bracket 2421 or the second magnet mounting bracket 2422. An upper side of the first image stabilization magnet 244a and the second image stabilization magnet 245a may have step portions 244a3, 244a4, 245a3, and 245a4 that are lower than the uplift portions 244a1, 244a2, 245a1, and 245a2 at the end portions of the magnet mounting brackets 2421 and 2422 in the width direction.

That is, the uplift portions 244a1, 244a2, 245a1, and 245a2 of the first image stabilization magnet 244a and the second image stabilization magnet 245a may be disposed between a pair of upper plate members 2421a, 2421b, 2422a, and 2422b in the central portion of the first magnet mounting bracket 2421 and the second magnet mounting bracket 2422, and the step portions 244a3, 244a4, 245a3, and 245a4 may be disposed to face the pair of upper plate members 2421a, 2421b, 2422a, and 2422b in the optical axis direction at the end portions. Therefore, when the height of the image stabilization unit 240 is reduced, a magnet mounting structure having a reduced height may be realized while minimizing a reduction of the sizes of the image stabilization magnets 244a and 245a.

Figure 6:
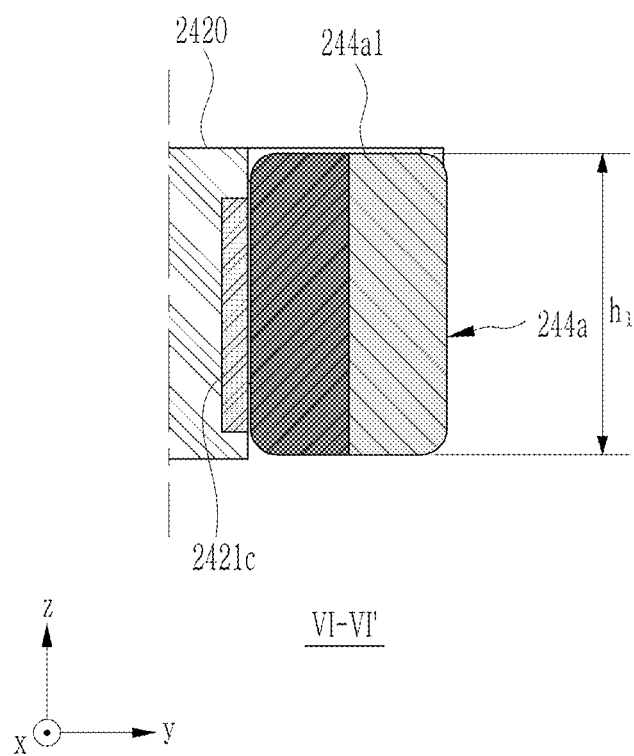
FIG. 6 shows a cross-sectional view taken along the line VI-VI' in FIG. 4.
Figure 7:
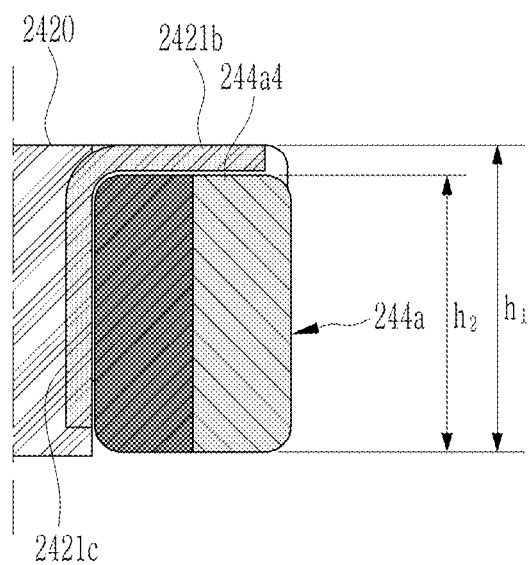
FIG. 7 shows a cross-sectional view taken along the line VII-VII' in FIG. 4.
Figure 7:
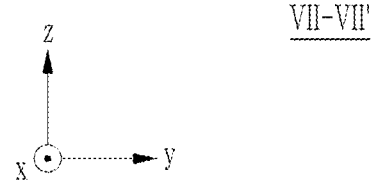

FIG. 6 shows a cross-sectional view taken along the line VI-VI' in FIG. 4, and FIG. 7 shows a cross-sectional view taken along the line VII-VII' in FIG. 4.

Referring to FIGS. 6 and 7, the upper end of the first image stabilization magnet 244a is blocked by the upper plate member 2421b in the step portion 2421b as shown in FIG. 7, and it extends close to the upper side of the molded frame structure 2420 of the lens holder 242 in the uplift portion 244a1 as shown in FIG. 6. Therefore, the magnet mounting portion 2421c and the upper plate member 2421b made of a magnetic material may fix the first image stabilization magnet 244a in place, and the size of the first image stabilization magnet 244a may be increased in the central portion of the first image stabilization magnet 244a in which the upper end of the first image stabilization magnet 244a is not blocked by the upper plate member 2421b. That is, a height h1 of the uplift portion 244a1 of the first image stabilization magnet 244a may be greater than a height h2 of the step portion 2421b.

Although no cross-section of the second image stabilization magnet 245a is shown in FIGS. 6 and 7, the configuration of the first image stabilization magnet 244a shown in FIGS. 6 and 7 may also be applied to the second image stabilization magnet 245a.

Figure 8:
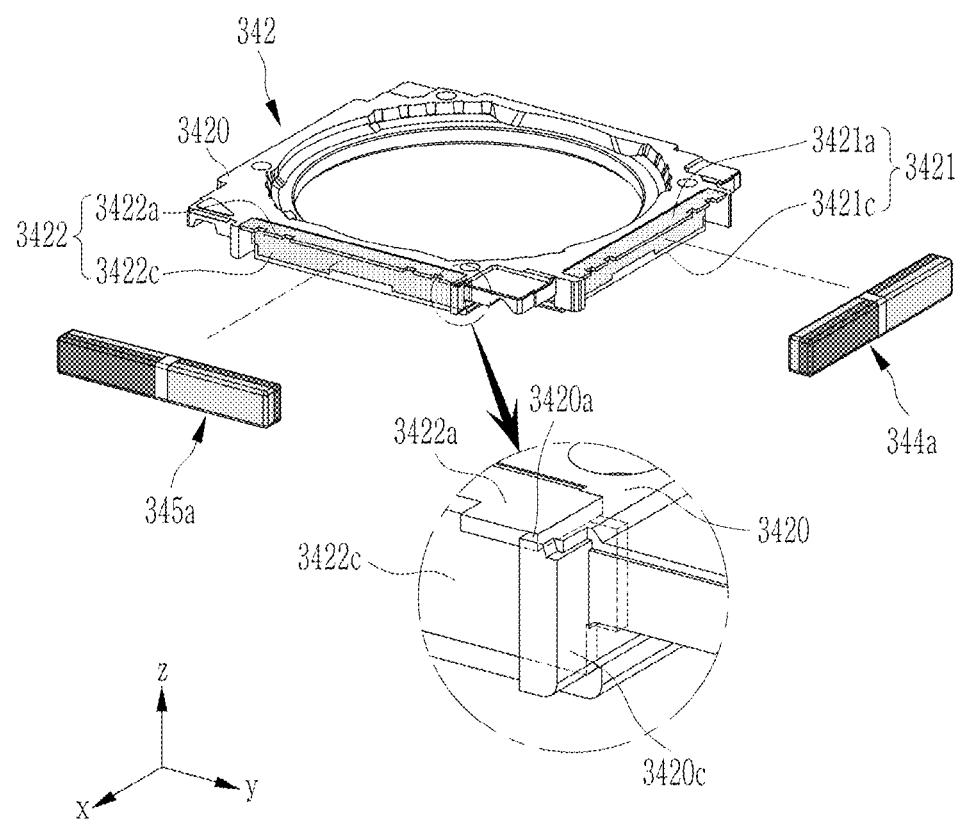
FIG. 8 shows an exploded perspective view of the lens holder of the camera module shown in FIG. 2 according to another embodiment.
Figure 9:
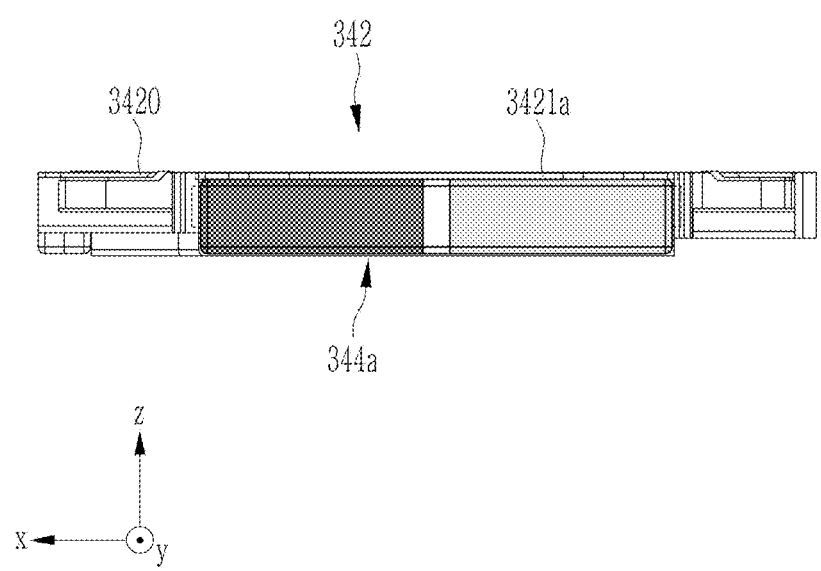
FIG. 9 shows an assembled side view of the lens holder shown in FIG. 8.

FIG. 8 shows an exploded perspective view of the lens holder of the camera module shown in FIG. 2 according to another embodiment, and FIG. 9 shows an assembled side view of the lens holder shown in FIG. 8.

Referring to FIGS. 8 and 9, a lens holder 342 according to the present embodiment includes a molded frame structure 3420, and a first magnet mounting bracket 3421 and a second magnet mounting bracket 3422 respectively disposed on a first external side and a second external side of the molded frame structure 3420 that are adjacent to each other and are orthogonal to each other.

The first magnet mounting bracket 3421 includes a first upper plate member 3421a protruding to the outside in the second axis direction (the y-axis direction) that is perpendicular to the optical axis direction from an upper end of the first external side of the molded frame structure 3420, and the second magnet mounting bracket 3422 includes a second upper plate member 3422a protruding to the outside in the first axis direction (the x-axis direction) that is perpendicular to the optical axis direction from an upper end of the second external side of the molded frame structure 3420.

In this instance, the first and second upper plate members 3421a and 3422a have upper sides that are perpendicular to the optical axis direction, and the upper sides may be positioned on the same plane as the upper side of the molded frame structure 3420 of the lens holder 342. That is, the upper sides of the first and second upper plate members 3421a and 3422a may be configured to be at the same height as the upper side of the molded frame structure 3420 of the lens holder 342.

The first and second upper plate members 3421a and 3422a may be made of a magnetic material. For example, the first and second upper plate members 3421a and 3422a may be made of magnetic stainless steel.

The first and second magnet mounting brackets 3421 and 3422 may include first and second magnet mounting portions 3421c and 3422c on the first external side or the second external side of the lens holder 342. First and second image stabilization magnets 344a and 345a may be mounted on and fixed to the first and second magnet mounting portions 3421c and 3422c by magnetic attraction because the first and second magnet mounting portions 3421c and 3422c may be made of a magnetic material. For example, the first and second magnet mounting portions 3421c and 3422c may be made of magnetic stainless steel. The first and second upper plate members 3421a and 3422a may be respectively integrally bent from the first and second magnet mounting portions 3421c and 3422c in the second axis direction (the y-axis direction) and the first axis direction (the x-axis direction), respectively.

The first image stabilization magnet 344a may be fixed to the first magnet mounting bracket 3421 on the first external side of the lens holder 342 by magnetic attraction, and the second image stabilization magnet 345a may be fixed to the second magnet mounting bracket 3422 on the second external side of the lens holder 342 by magnetic attraction.

Referring to the enlarged portion of FIG. 8, the molded frame structure 3420 of the lens holder 342 may include a projection portions 3420a covering parts of front edges of the first and second upper plate members 3421a and 3422a at the ends of the first and second magnet mounting brackets 3421 and 3422 in the width direction to lock the first and second magnet mounting brackets 3421 and 3422 in place on the molded frame structure 3420 of the lens holder 342. That is, the molded frame structure 3420 may include a lateral plate members 3420c perpendicularly protruding away from the molded frame structure 3420 adjacent to the end portions of the first and second magnet mounting brackets 3421 and 3422, and portions of the lateral plate members 3420c may be bent toward the first and second magnet mounting brackets 3421 and 3422 to form the projection portions 3420a.

The first and second magnet mounting brackets 3421 and 3422 may be mounted on the molded frame structure 3420 of the lens holder 342 so that the ends of the first and second upper plate members 3421a and 3422a in the width direction are inserted into spaces between the projection portions 3420a and the molded frame structure 3420 of the lens holder 342. Accordingly, the first and second magnet mounting brackets 3421 and 3422 may be locked in place on the molded frame structure 3420 of the lens holder 342 by the projection portions 3420a so the first and second magnet mounting brackets 3421 and 3422 may be prevented from separating from the molded frame structure 3420 of the lens holder 342.

Figure 10:
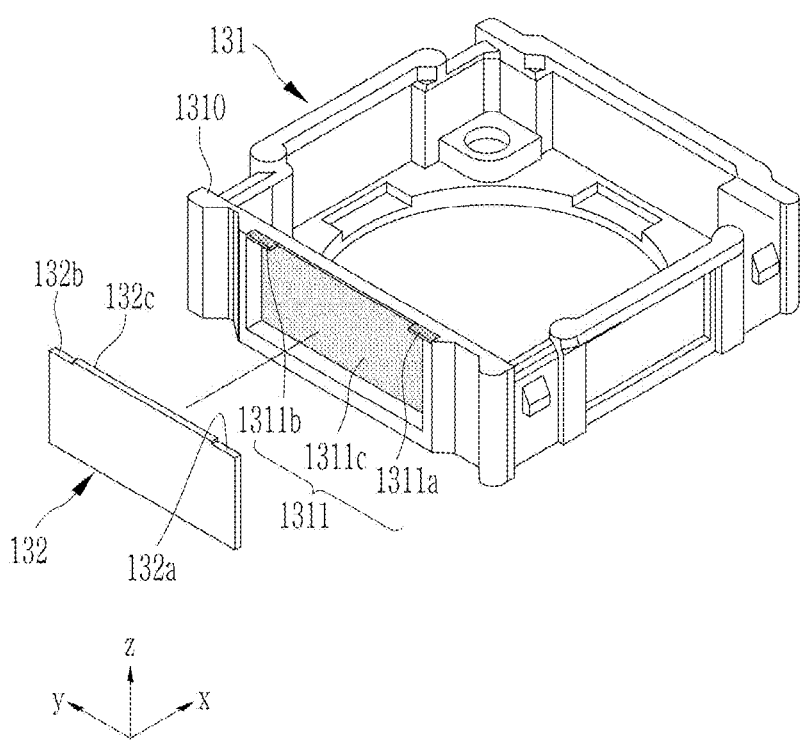
FIG. 10 shows an exploded perspective view of a carrier of the camera module shown in FIG. 2 according to an embodiment.

FIG. 10 shows an exploded perspective view of a carrier of the camera module shown in FIG. 2 according to an embodiment.

Referring to FIG. 10, a carrier 131 according to the present embodiment includes a magnet mounting bracket 1311 on the external side of a molded frame structure 1310 of the carrier 131. The magnet mounting bracket 1311 may include a pair of upper plate members 1311a and 1311b protruding away from an upper end of the external side of the molded frame structure 1310 in a direction perpendicular to the optical axis direction. A central portion of the magnet mounting bracket 1311 in a width direction (the y-axis direction) of the magnet mounting bracket 1311 is unobstructed in the optical axis direction. End portions of the magnet mounting bracket 1311 in the width direction (the y-axis direction) of the magnet mounting bracket 1311 are blocked in the optical axis direction by the pair of upper plate members 1311a and 1311b.

The upper plate members 1311a and 1311b may be formed by plate pieces that have sides that are perpendicular to the optical axis direction, and the upper sides of the upper plate members 1311a and 1311b may be on the same level as the upper side of the carrier 131 and may be disposed on a same plane. In other words, the upper sides of the upper plate members 1311a and 1311b and the upper side of the carrier 131 may be configured to be at the same height.

The upper plate members 1311a and 1311b may be made of a magnetic material. For example, they may be made of magnetic stainless steel.

The magnet mounting bracket 1311 may include a magnet mounting portion 1311c on the external side of the carrier 131, and a focus magnet 132 may be mounted on and fixed to the magnet mounting portion 1311c by magnetic attraction because the magnet mounting portion 1311c may be made of a magnetic material. For example, the magnet mounting portion 1311c may be made of magnetic stainless steel. The upper plate members 1311a and 1311b may be integrally bent from the magnet mounting portion 1311c in the direction perpendicular to the optical axis direction.

Regarding the carrier 131, the focus magnet 132 may be disposed on the central portion of the magnet mounting bracket 1311 in the width direction and on the end portions of the magnet mounting bracket 1311 in the width direction. That is, the focus magnet 132 may extend to the end portions from the central portion of the magnet mounting bracket 1311 in the width direction and may extend in the optical axis direction up to a position at which an upper end of the focus magnet 132 is blocked by the pair of upper plate members 1311a and 1311b.

The focus magnet 132 may have an uplift portion 132c protruding upward in the optical axis direction from the central portion of the magnet mounting bracket 1311 in the width direction. The upper side of the focus magnet 132 may have step portions 132a and 132b that are lower than the uplift portion 132c at the end portions of the magnet mounting bracket 1311 in the width direction.

That is, the uplift portion 132c of the focus magnet 132 is disposed between the pair of upper plate members 1311a and 1311b in the central portion of the magnet mounting bracket 1311, and the step portions 132a and 132b may be disposed to face the pair of upper plate members 1311a and 1311b in the optical axis direction in the end portions of the magnet mounting bracket 1311. Therefore, when the height of a focus unit including the carrier 131 is reduced, a magnet mounting structure may be realized while minimizing a reduction in the size of the focus magnet 132.

Figure 11:
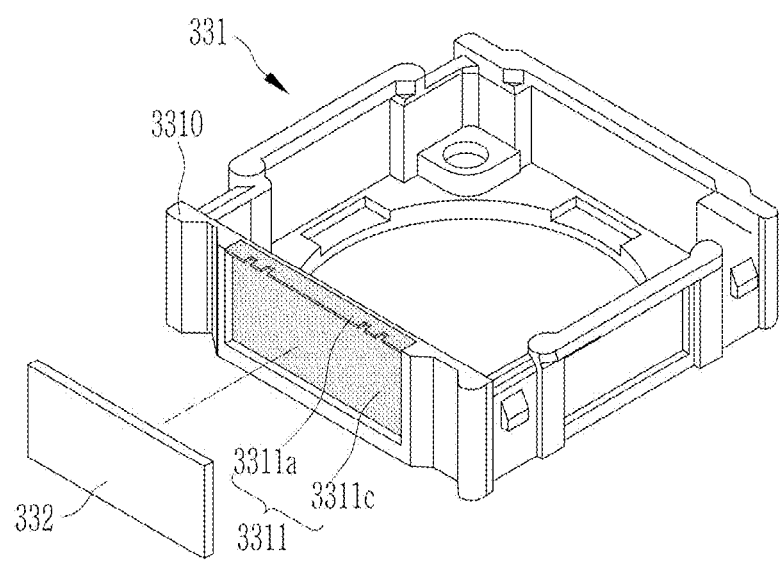
FIG. 11 shows an exploded perspective view of the carrier of the camera module shown in FIG. 2 according to another embodiment.

FIG. 11 shows an exploded perspective view of the carrier of the camera module shown in FIG. 2 according to another embodiment.

Referring to FIG. 11, a carrier 331 according to the present embodiment includes a magnet mounting bracket 3311 on the external side of a molded frame structure 3310. The magnet mounting bracket 3311 includes an upper plate member 3311a protruding to the outside in the first axis direction (the x-axis direction) that is perpendicular to the optical axis direction from an upper end of the external side of the molded frame structure 3310.

The upper plate member 3311a may have an upper side that is perpendicular to the optical axis direction, and the upper side of the upper plate member 3311a may be positioned on the same plane as the upper side of the molded frame structure 3310 of the carrier 331. That is, the upper side of the upper plate member 3311a may be configured to be at the same height as the upper side of the molded frame structure 3310 of the carrier 331.

The upper plate member 3311a may be made of a magnetic material. For example, it may be made of magnetic stainless steel.

The magnet mounting bracket 3311 may include a magnet mounting portion 3311c on the external side of the carrier 331, and a focus magnet 332 may be mounted on and fixed to the magnet mounting portion 3311c by magnetic attraction because the magnet mounting portion 3311c may be made of a magnetic material. For example, the magnet mounting portion 3311c may be made of magnetic stainless steel. The upper plate member 3311a may be integrally bent from the magnet mounting portion 3311c in the direction perpendicular to the optical axis direction.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens driving device comprising:
   a lens holder configured to hold a lens barrel; and
   an image stabilization driver comprising an image stabilization magnet and an image stabilization coil facing each other and configured to apply a driving force to the lens holder in a direction perpendicular to an optical axis of the lens holder,
   wherein the lens holder comprises a molded frame structure, and a magnet mounting bracket comprising an upper plate member protruding away from an upper end of an external side of the molded frame structure in a direction perpendicular to the optical axis, and
   an upper side of the upper plate member is disposed on a same plane as an upper side of the molded frame structure of the lens holder.

2. The lens driving device of claim 1, wherein the upper plate member comprises a magnetic material exposed to an outside of the molded frame structure of the lens holder.

3. The lens driving device of claim 1, wherein the magnet mounting bracket further comprises a magnet mounting portion comprising a magnetic material on an external side of the molded frame structure of the lens holder.

4. The lens driving device of claim 3, wherein the upper plate member is integrally bent from the magnet mounting portion in the direction perpendicular to the optical axis.

5. The lens driving device of claim 1, wherein the molded frame structure of the lens holder comprises a projection portion covering parts of a front edge of the upper plate member at end portions of the magnet mounting bracket in a width direction of the magnet mounting bracket to lock the magnet mounting bracket in place on the molded frame structure of the lens holder.

6. The lens driving device of claim 1, wherein a central portion of the magnet mounting bracket in a width direction of the magnet mounting bracket is unobstructed in a direction of the optical axis,
   the upper plate member comprises a pair of upper plate members extending in the direction perpendicular to the optical axis at upper ends of end portions of the magnet mounting bracket in the width direction that block the end portions of the magnet mounting bracket in the optical axis direction, and
   the image stabilization magnet is disposed on a central portion of the magnet mounting bracket in the width direction and on the end portions of the magnet mounting bracket in the width direction.

7. The lens driving device of claim 6, wherein the image stabilization magnet comprises an uplift portion protruding upward in the optical axis direction from the central portion of the magnet mounting bracket in the width direction.

8. The lens driving device of claim 7, wherein an upper side of the image stabilization magnet comprises a step portion that is lower than the uplift portion at the end portions of the magnet mounting bracket in the width direction and faces the upper plate member in the optical axis direction.

9. The lens driving device of claim 1, wherein the molded frame structure of the lens holder comprises a first external side and a second external side that are adjacent to each other and perpendicular to each other,
   the magnet mounting bracket comprises a first magnet mounting bracket and a second magnet mounting bracket respectively disposed on the first external side and the second external side of the molded frame structure of the lens holder,
   the image stabilization magnet comprises a first image stabilization magnet and a second image stabilization magnet respectively disposed on the first magnet mounting bracket and the second magnet mounting bracket,
   the image stabilization coil comprises a first image stabilization coil and a second image stabilization coil respectively facing the first image stabilization magnet and the second image stabilization magnet,
   the first image stabilization magnet and the first image stabilization coil are configured to apply a driving force to the lens holder in a first axis direction perpendicular to the optical axis, and
   the second image stabilization magnet and the second image stabilization coil are configured to apply a driving force to the lens holder in a second axis direction perpendicular to the optical axis and perpendicular to the first axis direction.

10. A camera module comprising:
    a housing;
    a lens barrel in which at least one lens is disposed;
    a lens holder in which the lens barrel is disposed;
    a frame supporting the lens holder;
    a carrier in which the lens holder and the frame are disposed, the carrier being disposed in the housing; and
    an image stabilization driver comprising an image stabilization magnet and an image stabilization coil facing each other and configured to apply a driving force to the lens holder in a direction perpendicular to an optical axis of the lens barrel, wherein the lens holder comprises a molded frame structure, and a magnet mounting bracket comprising an upper plate member protruding away from an upper end of an external side of the molded frame structure in a direction perpendicular to the optical axis, and an upper side of the upper plate member is disposed on a same plane as an upper side of the molded frame structure of the lens holder.

11. The camera module of claim 10, wherein the upper plate member comprises a magnetic material exposed to an outside of the molded frame structure of the lens holder.

12. The camera module of claim 10, wherein the magnet mounting bracket further comprises a magnet mounting portion comprising a magnetic material on the external side of the molded frame structure of the lens holder.

13. The camera module of claim 12, wherein the upper plate member is integrally bent from the magnet mounting portion in the direction perpendicular to the optical axis.

14. The camera module of claim 10, wherein the molded frame structure of the lens holder comprises a projection portion covering parts of a front edge of the upper plate member at end portions of the magnet mounting bracket in a width direction of the magnet mounting bracket to lock the magnet mounting bracket in place on the molded frame structure of the lens holder.

15. The camera module of claim 10, wherein a central portion of the magnet mounting bracket in a width direction of the magnet mounting bracket is unobstructed in a direction of the optical axis, the upper plate member comprises a pair of upper plate members extending in the direction perpendicular to the optical axis at upper ends of end portions of the magnet mounting bracket in the width direction that block the end portions of the magnet mounting bracket in the optical axis direction, and the image stabilization magnet is disposed on the central portion of the magnet mounting bracket in the width direction and on the end portions of the magnet mounting bracket in the width direction.

16. The camera module of claim 15, wherein the image stabilization magnet comprises an uplift portion protruding upward in the optical axis direction from the central portion of the magnet mounting bracket in the width direction.

17. The camera module of claim 16, wherein an upper side of the image stabilization magnet comprises a step portion that is lower than the uplift portion at the end portions of the magnet mounting bracket in the width direction and faces the upper plate member in the optical axis direction.

18. The camera module of claim 10, wherein the molded frame structure of the lens holder comprises a first external side and a second external side that are adjacent to each other and perpendicular to each other, the magnet mounting bracket comprises a first magnet mounting bracket and a second magnet mounting bracket respectively disposed on the first external side and the second external side of the molded frame structure of the lens holder, the image stabilization magnet comprises a first image stabilization magnet and a second image stabilization magnet respectively disposed on the first magnet mounting bracket and the second magnet mounting bracket, the image stabilization coil comprises a first image stabilization coil and a second image stabilization coil respectively facing the first image stabilization magnet and the second image stabilization magnet, the first image stabilization magnet and the first image stabilization coil are configured to apply a driving force to the lens holder in a first axis direction perpendicular to the optical axis, and the second image stabilization magnet and the second image stabilization coil are configured to apply a driving force to the lens holder in a second axis direction perpendicular to the optical axis and perpendicular to the first axis direction.

19. A lens driving device comprising:
a lens holder configured to hold a lens barrel;
a carrier in which the lens barrel is disposed; and
a focus driver comprising a focus magnet and a focus coil configured to apply a driving force to the carrier in a direction of an optical axis of the lens holder,
wherein the carrier comprises a molded frame structure, and a magnet mounting bracket comprising an upper plate member protruding away from an upper end of an external side of the molded frame structure in a direction perpendicular to the optical axis, and
an upper side of the upper plate member is disposed on a same plane as an upper side of the molded frame structure.

20. The lens driving device of claim 19, wherein the magnet mounting bracket further comprises a magnet mounting portion comprising a magnetic material on an external side of the molded frame structure of the carrier.

21. The lens driving device of claim 19, wherein a central portion of the magnet mounting bracket in a width direction of the magnet mounting bracket is unobstructed in the optical axis direction, the upper plate member comprises a pair of upper plate members extending in the direction perpendicular to the optical axis at upper ends of end portions of the magnet mounting bracket in the width direction that block the end portions of the magnet mounting bracket in the optical axis direction, and the focus magnet is disposed on a central portion of the magnet mounting bracket in the width direction and on the end portions of the magnet mounting bracket in the width direction.

22. The lens driving device of claim 21, wherein the focus magnet comprises an uplift portion protruding upward in the optical axis direction from the central portion of the magnet mounting bracket in the width direction.

23. The lens driving device of claim 22, wherein an upper side of the image stabilization magnet comprises a step portion that is lower than the uplift portion at the end portions of the magnet mounting bracket in the width direction and faces the upper plate member in the optical axis direction.

24. A camera module comprising:
a housing;
a lens barrel in which at least one lens is disposed;
a lens holder in which the lens barrel is disposed;
a frame supporting the lens holder;
a carrier in which the lens holder and the frame are disposed, the carrier being disposed in the housing; and
a focus driver comprising a focus magnet and a focus coil facing each other and configured to apply a driving force to the carrier in a direction of an optical axis of the lens barrel,
wherein the carrier comprises a molded frame structure, and a magnet mounting bracket comprising an upper plate member protruding away from an upper end of an external side of the molded frame structure in a direction perpendicular to the optical axis direction, and an upper side of the upper plate member is disposed on a same plane as an upper side of the molded frame structure of the carrier.

25. The camera module of claim 24, wherein the magnet mounting bracket further comprises a magnet mounting portion comprising a magnetic material on the external side of the molded frame structure of the carrier.

26. The camera module of claim 24, wherein a central portion of the magnet mounting bracket in a width direction of the magnet mounting bracket is unobstructed in the optical axis direction,
 the upper plate member comprises a pair of upper plate members extending in the direction perpendicular to the optical axis at upper ends of end portions of the magnet mounting bracket in the width direction that block the end portions of the magnet mounting bracket in the optical axis direction, and
 the focus magnet is disposed on the central portion of the magnet mounting bracket in the width direction and on the end portions of the magnet mounting bracket in the width direction.

27. The camera module of claim 26, wherein the focus magnet comprises an uplift portion protruding upward in the optical axis direction from the central portion of the magnet mounting bracket in the width direction.

28. The camera module of claim 27, wherein an upper side of the image stabilization magnet comprises a step portion that is lower than the uplift portion at the end portions of the magnet mounting bracket in the width direction and faces the upper plate member in the optical axis direction.

\* \* \* \* \*